(No Model.) 2 Sheets—Sheet 1.

G. S. PIDGEON.
HYDRAULIC MOTOR.

No. 337,864. Patented Mar. 16, 1886.

Witnesses:
Jas. E. Hutchinson.
Henry C. Hazard.

Inventor:
Geo. S. Pidgeon, by
Pindle & Russell, his attys (No Model.) 2 Sheets—Sheet 2.

G. S. PIDGEON.
HYDRAULIC MOTOR.

No. 337,864. Patented Mar. 16, 1886.

Witnesses:
Jas. E. Hutchinson
Henry C. Hazard

Inventor.
George S. Pidgeon
by Prindle and Russell
Attorneys

N. PETERS. Photo-Lithographer. Washington, D. C.

UNITED STATES PATENT OFFICE.

GEORGE S. PIDGEON, OF SAN DIEGO, CALIFORNIA.

HYDRAULIC MOTOR.

SPECIFICATION forming part of Letters Patent No. 337,864, dated March 16, 1886.

Application filed September 13, 1883. Serial No. 106,353. (No model.)

*To all whom it may concern:*

Be it known that I, GEORGE S. PIDGEON, of San Diego, in the county of San Diego and State of California, have invented certain new and useful Improvements in Wind and Water Machines; and I do hereby declare that the following is a full, clear, and exact description thereof, reference being had to the accompanying drawings, in which—

Figure 1:
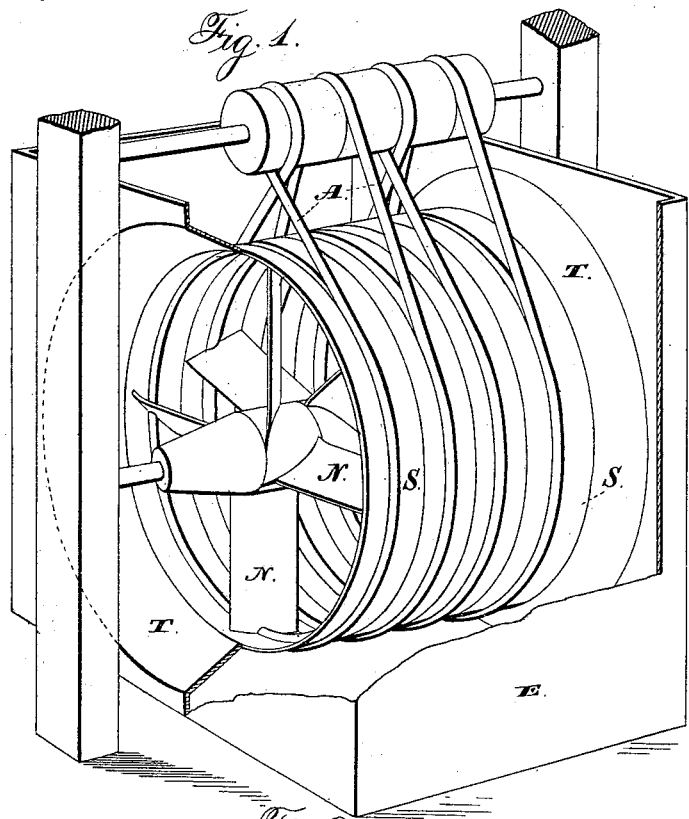
Figure 2:
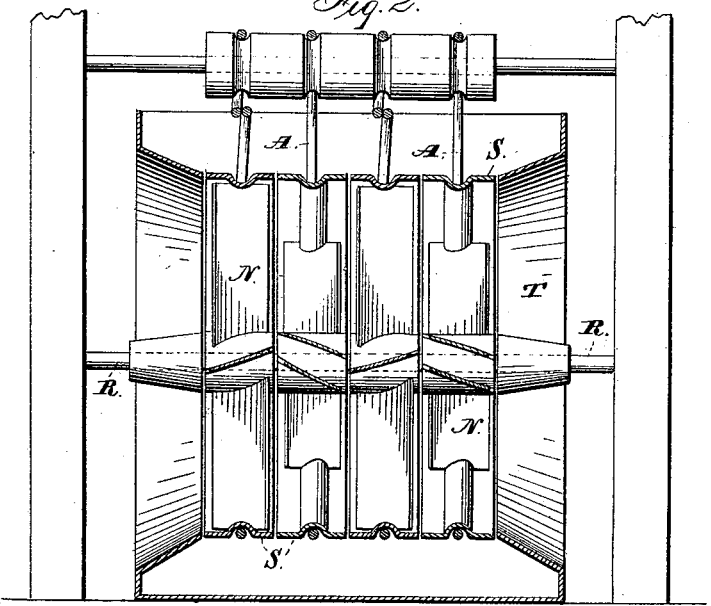
Figure 3:
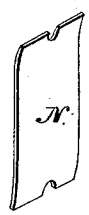
Figure 4:
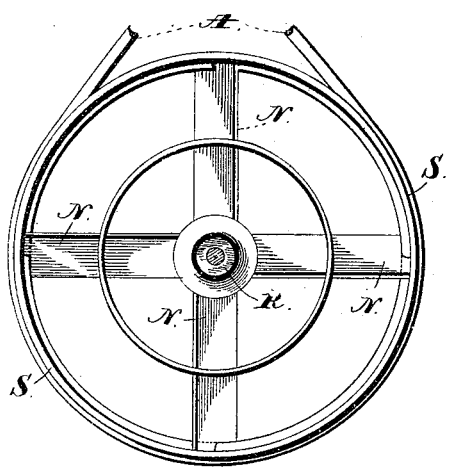

Figure 1 shows a perspective view of my motor with a part of the casing removed. Fig. 2 shows a longitudinal central vertical section of the same, and Fig. 3 a detail view of one of the blades or arms which support at their outer ends the rims of the wheels. Fig. 4 is a modification showing the wheel divided into annular divisions by concentric rings.

Letters of like name and kind refer to like parts in each of the figures.

My invention relates to machines having vertical wheels, mainly intended as a submarine tide-machine, but which may be used in rivers and as a windmill.

My motor is obviously adapted to be driven by wind as well as water. In such cases it is, as usual in windmills, to be provided with a directing-vane, and be supported in a pivoted frame.

As none of the parts of my motor need be changed at all to adapt it to be driven by the wind, it is not necessary herein to describe or show the common and well-known form of swiveled frame and directing-vane to be used; but in water it is intended to be stationary and submerged, except so much of the case as may be above the wheels and water-level within.

The machine consists of one or more of the wheels S S S, of suitable diameter and width, revolving around the shaft R (if more than one, in opposite directions each one to the next) within the case or box E. The shaft R projects or is so otherwise arranged and supported as not to prevent a free passage of current through the machine. The space inclosed within the rim of each of the wheels S S S is in line with the circular openings in the ends of the case E. The centers of the wheels are in line with the centers of such openings, and the diameters of the space within each wheel-rim is equal to that of either opening in the case end. Each wheel has the arms or blades N N, which can, if desired, have straight faces or edges. I prefer, however, to make the blades reversely curved, as shown in the drawings. These blades are radial and placed obliquely to the direction of the current of air or water through the machine, so as to secure the greatest power from the impact of the water upon them.

In adjacent wheels the blades are made oblique to the current in opposite directions, as illustrated clearly in the drawings.

The rims of the wheels are grooved peripherally. In these grooves fit the bands A A, passing around the rims. I prefer to form these grooves by corrugating the rims, so that while a groove is formed in the external face of the rim a corresponding rib is also formed on the inner face thereof.

Each of the wheels may, if desired, be divided up into annular divisions by smaller concentric rings similar to the rim in shape and size, being placed within the rim and having blades similar to those described, but shorter, extending between and connecting the rings and rim. The current may be directed through any one or more of such divisions, the others being closed, if desired, by plates or any suitable means. The rope or belt A passes round the outside or rim of each wheel, and thence to a pulley on shafting placed at any convenient distance.

The exterior of the wheels S S S on the shaft R is to be inclosed by the box or case E, to prevent lateral or outward pressure.

The belts of alternate wheels are crossed before passing around the grooved periphery of the pulley on the counter-shaft, so that all the wheels will act to drive said pulley in the same direction, the case E having funnel-shaped openings T T, of the same interior diameter as the wheel within and fitting closely to increase the volume and velocity of the current passing through, as well as to furnish a means of securing the machine in proper position.

The outer end of each vane is notched, as shown. This notch engages the rib on the under face of the rim.

The inner end of each blade is fitted and held in a groove in the hub.

Having thus described my invention, what I claim is—

1. In a motor adapted to be driven by the passage of water or air, the combination of a stationary shaft, a series of wheels journaled thereon and provided with vanes or blades inclined in opposite directions in the adjacent wheels, a counter-shaft, and connecting means between this shaft and the wheels, whereby the wheels all act to drive the shaft in the same direction, substantially as shown and described.

2. The combination of a stationary shaft, wheels journaled thereon and provided with radial vanes or blades inclined in opposite directions in adjacent wheels, a counter-shaft provided with a suitable pulley fixed thereon, and endless bands passing around the wheels and around the pulley in such direction that all the bands will act to drive the pulley in the same direction, substantially as shown and described.

3. The combination of the shaft, the wheels journaled thereon forming with their rims a cylinder for the passage of water or air and provided with vanes or blades inclined in adjacent wheels in opposite directions with reference to the line of such passage, and the endless bands passing around and guided in grooves in the wheel-rims and the pulley on the shaft, alternate bands being crossed between the wheels and pulley, substantially as shown and described.

4. In a motor-wheel, the combination of the rim corrugated peripherally to form an external groove for the driving-band and an internal rib, a hub having grooves to receive and hold the inner ends of the blades of the wheel, and the vanes or blades notched at their outer ends to engage the rib on the rim and fitting at their inner ends in the grooves in the hub, substantially as shown and described.

GEORGE S. PIDGEON.

Witnesses:
H. H. CANDEE,
L. D. BAYLEY.